United States Patent
Prasad

(10) Patent No.: US 6,381,214 B1
(45) Date of Patent: Apr. 30, 2002

(54) MEMORY-EFFICIENT LEAKY BUCKET POLICER FOR TRAFFIC MANAGEMENT OF ASYNCHRONOUS TRANSFER MODE DATA COMMUNICATIONS

(75) Inventor: Sharat Prasad, San Jose, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/169,604

(22) Filed: Oct. 9, 1998

(51) Int. Cl.$^7$ .................. G01R 31/08; G06F 11/00; G08C 15/00; H04T 1/16; H04T 3/14

(52) U.S. Cl. .................. 370/230.1; 370/235.1; 370/395.21

(58) Field of Search .................. 370/229, 230, 370/230.1, 231, 235, 235.1, 236, 236.1, 236.2, 237, 395.1, 395.2, 395.21, 395.6, 395.62

(56) References Cited

U.S. PATENT DOCUMENTS

| | | | |
|---|---|---|---|
| 4,769,810 A | | 9/1988 | Eckberg, Jr. et al. |
| 4,769,811 A | | 9/1988 | Eckberg, Jr. et al. |
| 5,864,540 A | * | 1/1999 | Bonomi et al. .............. 370/235 |
| 6,011,775 A | * | 1/2000 | Bonomi et al. .............. 370/230 |
| 6,064,677 A | * | 5/2000 | Kappler et al. .............. 370/414 |
| 6,072,776 A | * | 6/2000 | Takamichi .................. 370/242 |
| 6,108,303 A | * | 8/2000 | Fahmi et al. ................ 370/230 |
| 6,198,743 B1 | * | 3/2001 | Giroux et al. .............. 370/395 |

OTHER PUBLICATIONS

Introduction to SONET ATM (Texas Instruments, 1996).
LAN Emulation Over ATM Specification, Version 1.0 (The ATM Forum, Jan. 1995), Sections 1.1 through 2.3.7.
Traffic Management Specification, Version 4.0 (The ATM Forum, Apr. 1996), Section 4.4.2.
Traffic Management Specification, Version 4.0, (The ATM Forum, Apr. 1996), Normative Annex C.
Siu and Jain, "A Brief Overview of ATM: Protocol Layers, LAN Emulation, and Traffic Management", http://cis.ohio-state.edu/~jain/papers/html/atm_tut/ (Jul. 20, 1998).

* cited by examiner

*Primary Examiner*—David R. Vincent
*Assistant Examiner*—Bob A. Phunkulh
(74) *Attorney, Agent, or Firm*—J. Dennis Moore; W. James Brady, III; Frederick J. Telecky, Jr.

(57) ABSTRACT

A method and system for policing Asynchronous Transfer Mode (ATM) traffic, or for performing traffic shaping under ATM protocol, are disclosed. The disclosed system may be implemented into an ATM hub (22), ATM switches (24, 28), or in network routers (30), at which either a User-to-Network or Node-to-Network interface is present. Parameter memory (38) in scheduling circuitry (34) of these devices stores a difference field value (TAT-L)*, limit field value L*, and increment field value I for each virtual channel being handled. The difference field value (TAT-L)* is stored using fewer bits than used by a global timer (54) to monitor global time and represent arrival time of cells, and both the difference field value (TAT-L)* and the limit field value L* are stored as two's complements of their actual value. Periodic resetting, to zero, of the difference field value (TAT-L)* is carried out by circuitry (60, 62), upon a determination that the least significant portion of the global time is later than the difference field value (TATL)* of the channel. Circuitry (64) implements a leaky bucket algorithm to determine whether arrived cells are conforming, using the reduced bit width representations of the difference field value (TAT-L)* in parameter memory (38).

15 Claims, 6 Drawing Sheets

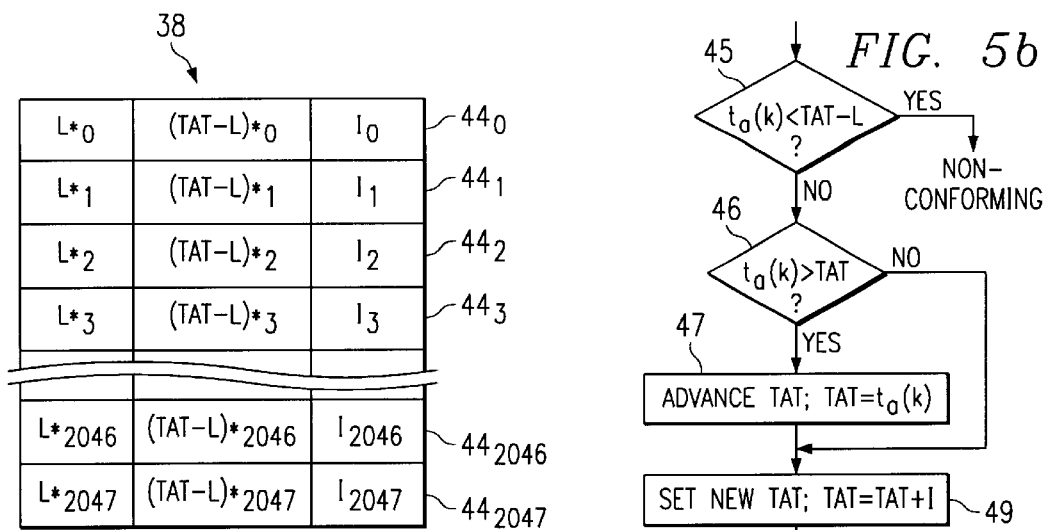
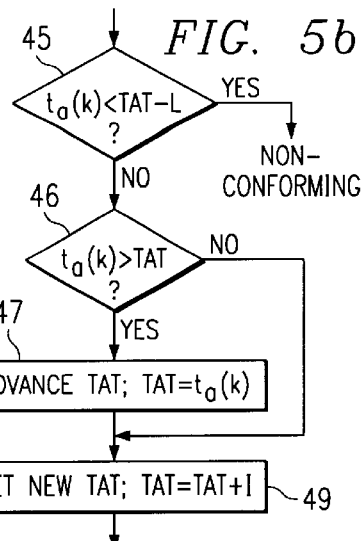
FIG. 4
FIG. 5b
FIG. 5a
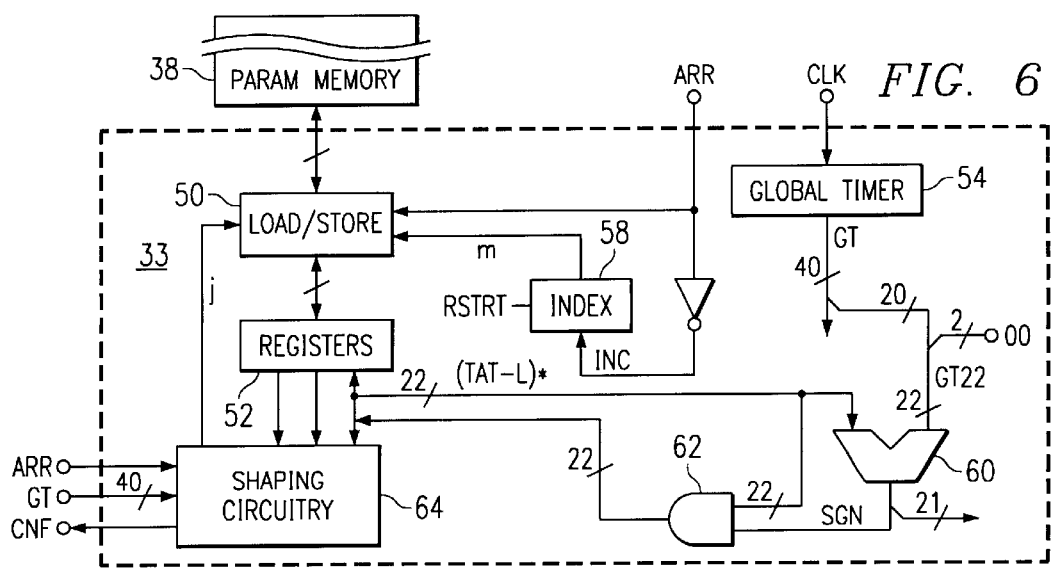
FIG. 6

MEMORY-EFFICIENT LEAKY BUCKET POLICER FOR TRAFFIC MANAGEMENT OF ASYNCHRONOUS TRANSFER MODE DATA COMMUNICATIONS

CROSS-REFERENCE TO RELATED APPLICATIONS

This application is related to copending application Ser. No. 08/993,801, filed Dec. 18, 1997, now U.S. Pat. No. 6,205,151 and commonly assigned herewith.

STATEMENT REGARDING FEDERALLY SPONSORED RESEARCH OR DEVELOPMENT

Not applicable.

BACKGROUND OF THE INVENTION

This invention is in the field of data communications, and is more specifically directed to traffic management of packet-based data communications.

In the field of digital communications, whether applied to voice, video, or data communication, various techniques have been developed for routing messages among nodes, or processors, that are connected in a network. One such approach is referred to as packet-based data communications, in which certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information that can be communicated between concentrators (i.e., between the store and forward nodes), and is typically a portion of a message or file. Each packet includes header information relating to the source network address and destination network address, which permits proper routing of the message packet. Packet switching with short length packets ensures that routing paths are not unduly dominated by long individual messages, and thus reduces transmission delay in the store-and-forward nodes. Packet-based data communications technology has enabled communications to be carried out at high data rates, up to and exceeding hundreds of megabits per second.

A well-known example of a fast packet switching protocol, which combines the efficiency of packet switching with the predictability of circuit switching, is Asynchronous Transfer Mode (generally referred to as "ATM"), in which packet lengths and organization are fixed, regardless of message length or data type (i.e., voice, data, or video). The fixed packets according to the ATM protocol are referred to as "cells", and each ATM cell is composed of fifty-three bytes, five of which are dedicated to the header and the remaining forty-eight of which serve as the payload. According to this protocol, larger packets are made up of a number of fixed-length ATM cells. The fixed-size cell format enables ATM cell switching to be implemented in hardware, as opposed to software, resulting in transmission speeds in the gigabits-per-second range. In addition, the switching of cells rather than packets permits scalable user access to the network, from a few Mbps to several Gbps, as appropriate to the application. The asynchronous nature of the transmission permits ATM cells to be used in transmitting delay-tolerant data traffic intermixed with time-sensitive traffic like voice and video over the same backbone facility. To more efficiently utilize the bandwidth for these various applications, traffic management techniques are now employed which give priority to time-sensitive traffic relative to delay-tolerant traffic.

Closed loop traffic management involves the use of feedback signals between two network nodes to govern the data rates of channels, with a goal of improving the efficiency of bandwidth utilization. This efficiency improvement is particularly necessary when communication of compressed voice and video information is involved, because of the variability in bit rate caused by compression. In this case, the feedback signals enable the network to communicate either the availability of bandwidth or the presence of congestion.

Current traffic management schemes utilize various transmission categories to assign bandwidth in ATM communications. One high priority category is Constant Bit Rate (CBR), in which the transmission is carried out at a constant rate. Two categories of Variable Bit Rate (VBR) transmission are also provided, one for real-time information and another for non-real-time information. A low priority category is Unspecified Bit Rate (UBR), in which data are transmitted by the source with no guarantee of transmission speed. In the recently-developed Available Bit Rate (ABR) service class, feedback from the network nodes, via Resource Management (RM) cells or by way of explicit congestion indications in data cells, is used by the source network node to dynamically control channel transmission rate in response to current network conditions, and within certain transmission parameters that are specified upon opening of the transmission channel (i.e., in the traffic "contract").

For the ABR class of service, the source and destination nodes agree, in the traffic contract, upon the Peak Cell Rate (PCR) and Minimum Cell Rate (MCR), thus setting the upper and lower bounds of transmission for an ABR communication. Once these bounds are established, a flow control algorithm is executed, typically at the source network node and in ATM switches, to define the desired transmission rate for each channel. As is known in the art, thousands of connections may be simultaneously open between a given pair of network nodes. As such, traffic management can be a relatively complex operation, especially in controlling ABR category communications.

At the source network node, and also at switches within the ATM network (e.g., at the edges of network domains), Segmentation and Reassembly (SAR) devices or shaper devices are used to arrange and transmit ATM cells according to the traffic contract established at the time of subscription. An often-used traffic shaping device is referred to in the art as a "leaky bucket", as this device includes buffers that can rapidly fill up with cell data during bursts, but steadily "leak" or transmit data over the network. These leaky bucket functions effectively verify conformance of each cell with respect to its traffic "contract", ensuring that one or more channels do not dominate the bandwidth, to the exclusion of others.

The algorithm according to which such conformance is defined is referred to, for example in *Traffic Management Specification, Version* 4.0 (The ATM Forum, April 1996), Section 4.4.2, as the Generic Cell Rate Algorithm, or GCRA. The GCRA is required, by this specification, to be performed at each public User-to-Network Interface (UNI) as part of Usage Parameter Control (UPC) operations for Peak Cell Rate (PCR) of the Cell Loss Priority (CLP=0+1) flow; similar processing is optional in Network Parameter Control (NPC) at Network-to-Node Interfaces (NNIs), for example in the case where a downstream network domain requires traffic shaping to be performed by domains transmitting traffic thereto. UPC (and, analogously, NPC) "polices" the traffic on each ATM connection to enforce the compliance of every ATM connection to its traffic contract.

Fundamentally, the leaky bucket device is a container of "tokens" that are periodically added to the bucket as a measure of elapsed time, where one token is removed from the bucket for every cell that is found to be compliant. An arriving cell is found to be compliant if the token bucket is not empty upon its arrival. When used as a "traffic shaper", the GCRA operates to transmit traffic at a relatively steady rate, even if the cells are arriving in a "bursty" fashion. It is with respect to this shaper function that the GCRA is referred to as a "leaky bucket" function, as the arriving cells are effectively stored and sent along the network at a fixed rate; if too many cells arrive over a period of time, the cell "bucket" overflows (i.e., the token bucket is empty), in which case some cells are deemed non-conforming (as arriving at an excessively high frequency) and may be discarded.

One bit in the header of each ATM cell is the CLP (Cell Loss Priority) bit. The CLP bit permits two priorities of traffic, where lower priority, CLP(1), cells may be discarded as necessary to ensure adequate network performance for higher priority CLP(0), cells. CLP(0+1) traffic refers to the aggregate traffic, including both the lower and higher priority flows. With regard to the policing function, such as using the GCRA, if a CLP(0) cell is found to be non-conforming upon arrival, this cell may be tagged by setting its CLP bit; the tagged high priority cell may still be passed if its arrival conforms to the aggregate CLP(0+1) parameters, but will be discarded if its arrival did not conform to the aggregate parameters. In any event, a selective cell discard operation may discard all CLP(1) cells, whether transmitted at low priority or tagged due to non-conformance.

The traffic contract of a Virtual Connection (VC), or channel, may have many parts. As an example, one part of the contract may limit the proximity of successive cell arrivals by specifying a Peak Cell Rate (PCR) and a Cell Delay Variation Tolerance (CDVT). In addition, a second part of the contract may impose an average traffic intensity, while permitting some degree of burstiness, by specifying a Sustainable Cell Rate (SCR) and a Burst Tolerance (BT). Other parts of the contact may even impose restrictions on the packet stream from which the cell stream of the VC is derived.

In operation, the traffic contract of each VC specifies an Increment (I) and a Limit (L). Increment I is a measure of time that corresponds to the reciprocal of either the PCR or the SCR specified in the traffic contract of the channel. Limit L corresponds to the CDVT or the BT, and as such is a measure of the acceptable deviation from the ideal delay between successive cell arrivals, or the maximum backlog due to cells arriving at a rate greater than the SCR, as specified in the traffic contract for the channel. In the interest of clarity, the description to follow will only address the use of the GCRA to verify conformance to PCR in conjunction with the CDVT part of the contract. It is to be understood that the conventional GCRA (as well as the present invention described herein) may also be used for other traffic contract verification and traffic shaping functions.

In this regard, FIG. 1a illustrates an example of a conventional virtual scheduling algorithm for the GCRA, in which the conformance of a cell k arriving at a time $t_a(k)$ is determined, using a Theoretical Arrival Time (TAT). Theoretical Arrival Time TAT is a point in time at which a cell ought to arrive if communicated exacty at the PCR. In FIG. 1a, the GCRA operation begins with process 2, in which cell k arrives at a policer function at arrival time $t_a(k)$. For purposes of this description, the policer function is a device that performs traffic policing functions, and as such corresponds to a GCRA device or virtual scheduler; further, the policer function may be implemented at the ingress of an ATM switch. When used as a shaper, the function may be implemented in an SAR device or at the egress of an ATM switch. Time $t_a(k)$ corresponds to the value of a global timer at the time of the arrival of cell k; the global timer, as will be described below, is typically a very wide (e.g., 48 bit) counter that is incremented with each clock period, wrapping around on overflow. Decision 3 is then next performed by the policer function to determine if the arrival time $t_a(k)$ is later than (i.e., greater than) the current value of Theoretical Arrival Time TAT. If so (decision 3 is YES), cell k is necessarily conforming, as its arrival occurred at a time, after the arrival of cell k–1 for the same channel, that was longer than that indicated by the PCR of the channel. In this case, the policer function sets the current value of Theoretical Arrival Time TAT at the actual arrival time $t_a(k)$, and passes control to process 6, in which the policer function increments the Theoretical Arrival Time TAT by Increment I, which as noted above is approximately the reciprocal of the PCR for that channel, specified in the traffic contract. The process then awaits the receipt of the next cell (k+1), in which case the process will repeat.

If, however, the actual arrival time $t_a(k)$ of cell k is at or earlier than (not greater than) Theoretical Arrival Time TAT (i.e., decision 3 is NO), decision 5 is next performed by the policer function to compare the sum of the actual arrival time $t_a(k)$ and Limit L to Theoretical Arrival Time TAT. As noted above, Limit L corresponds to the Cell Delay Variation Tolerance (CDVT), which is the maximum allowed deviation in the delay between successive cell arrivals specified in the traffic contract. As such, if the actual arrival time $t_a(k)$ is within Limit L of Theoretical Arrival Time TAT (decision 5 is NO), cell k is still deemed to be conforming and Theoretical Arrival Time TAT is updated to increment I from the actual arrival time, in process 6. However, if Theoretical Arrival Time TAT is later than actual arrival time $t_a(k)$ plus Limit L (decision 5 is YES), cell k is non-conforming, and control passes to process 8 in which cell k is tagged or discarded.

FIG. 1b illustrates another conventional GCRA, implemented by way of a continuous-state "leaky bucket" algorithm. In this approach, cell k arrives in process 10 at time $t_a(k)$, as before. Process 12 is then performed by the policer function, to set an auxiliary variable (X') to the difference of the current value (X) of the leaky bucket counter, less the difference between the actual arrival time $t_a(k)$ and a Last Conformance Time (LCT) at which a cell arrived for the current channel that was in conformance. In decision 13, the policer function determines if the value of auxiliary variable X' is less than zero; if so (decision 13 is YES), the delay between the arrival of cell k and Last Conformance Time LCT was less than the value X of the leaky bucket counter. Cell k is then deemed conforming, the value of auxiliary variable X' is set to zero in process 14; process 16 then updates the value of leaky bucket counter X to Increment I (X' set to zero in process 14), and sets Last Conformance Time LCT to actual arrival time $t_a(k)$, since cell k was in conformance. The policer function then waits until receipt of the next cell (k+1).

If, on the other hand, the value of auxiliary variable X' is found, in process 13, to be equal to or greater than zero (decision 13 is NO), the actual arrival time $t_a(k)$ may be so soon as to render cell k in non-conformance. As before, decision 13 is NO in the event that actual arrival time $t_a(k)$ differs from Last Conformance Time LCT by a relatively small period of time. Decision 15 then determines whether the value of auxiliary variable X' is greater than Limit L; if so (decision 15 is NO), cell k is conforming, and process 16 is then carried out by the policer function to adjust the value of leaky bucket counter X (to equal the current value of auxiliary variable X' plus Increment I) and to update Last Conformance Time LCT to the arrival time $t_a(k)$. However, if the value of auxiliary variable X' is equal to or less than Limit L, cell k is not in conformance; process 18 is then performed to tag or discard cell k, as the case may be.

Many policer functions, whether implemented at a network interface or at a switch within a network, and especially in WAN-core ATM switches, are now handling large numbers of virtual channels, in some cases numbering into the hundreds of thousands. The complexity of effecting traffic shaping increases dramatically with the number of channels being handled, and particularly when ABR communications are involved. Particularly, the memory requirements involved in effecting the GCRA greatly increase, especially with the number of bits (e.g., forty) commonly used in representing time in such devices.

BRIEF SUMMARY OF THE INVENTION

It is therefore an object of the present invention to provide a traffic shaping function in which the memory requirements are greatly reduced.

It is a further object of the present invention to provide such a function that may be implemented, at low cost, in conventional switches and network interface functions.

Other objects and advantages of the present invention will be apparent to those of ordinary skill in the art having reference to the following specification together with its drawings.

The present invention may be implemented in a traffic shaping or policing function in a network switch or interface in which a storage location is provided for each virtual channel to be handled. This storage location includes a field for Increment and Limit values for the channel, and also a field storing the Theoretical Arrival Time minus the Limit for the channel and utilizing a fewer number of bits than those used to represent the global time for the switch. Because of these fewer bits, wraparound of the TAT-L field requires periodic updating of its value, and fewer bits per channel reduces the overall memory necessary for traffic policing and shaping.

BRIEF DESCRIPTION OF THE SEVERAL VIEWS OF THE DRAWING

FIG. 4 is a memory map of parameter memory in the ATM hub of FIG. 3, arranged according to the preferred embodiment of the invention.

FIG. 5a is a time line illustrating an example of the theory of operation of the preferred embodiment of the invention.

FIG. 5b is a flow diagram illustrating the generalized leaky bucket operations according to the preferred embodiment of the invention.

FIG. 6 is an electrical diagram, in block form, of portions of the scheduler of the ATM network interface of FIG. 3a, constructed according to the preferred embodiment of the invention.

DETAILED DESCRIPTION OF THE INVENTION

As will become apparent from the following description, the present invention may be utilized at various locations within an overall data communications network. More specifically, the present invention is beneficial when utilized at interfaces within a data communications network operating according to Asynchronous Transmission Mode (ATM) protocols, primarily at network interfaces and switches at which traffic shaping or policing is to be effected. The following description will be provided in connection with such a network. It is to be understood, however, that the present invention may be utilized in connection with other network applications at which the transmission rate of one or more channels is to be policed or managed, as will be evident to those of ordinary skill in the art having reference to the following description. Such alternative applications and uses of the present invention are, of course, intended to be within the scope of the invention as hereinafter claimed.

Figure 1A:
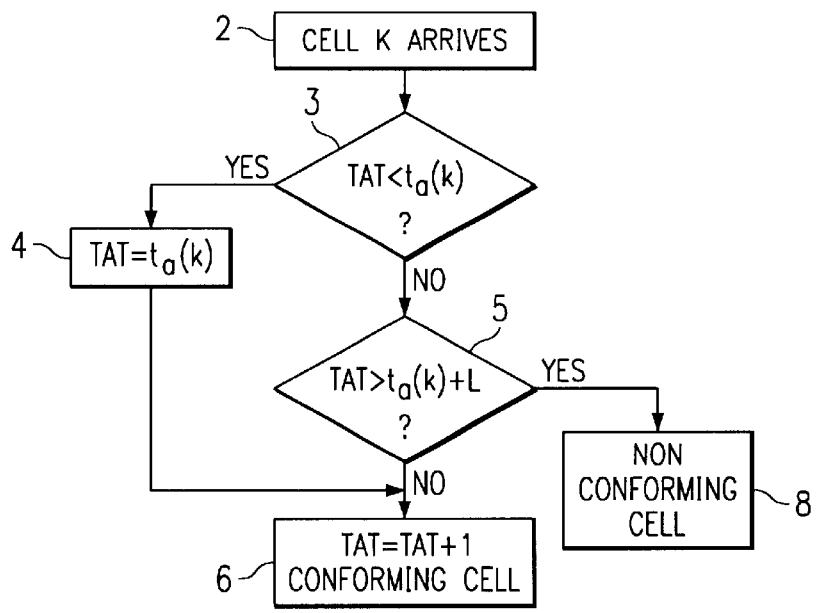
FIGS. 1a and 1b are flow diagrams illustrating the operation of conventional implementations of the Generic Cell Rate Algorithm.
Figure 1B:
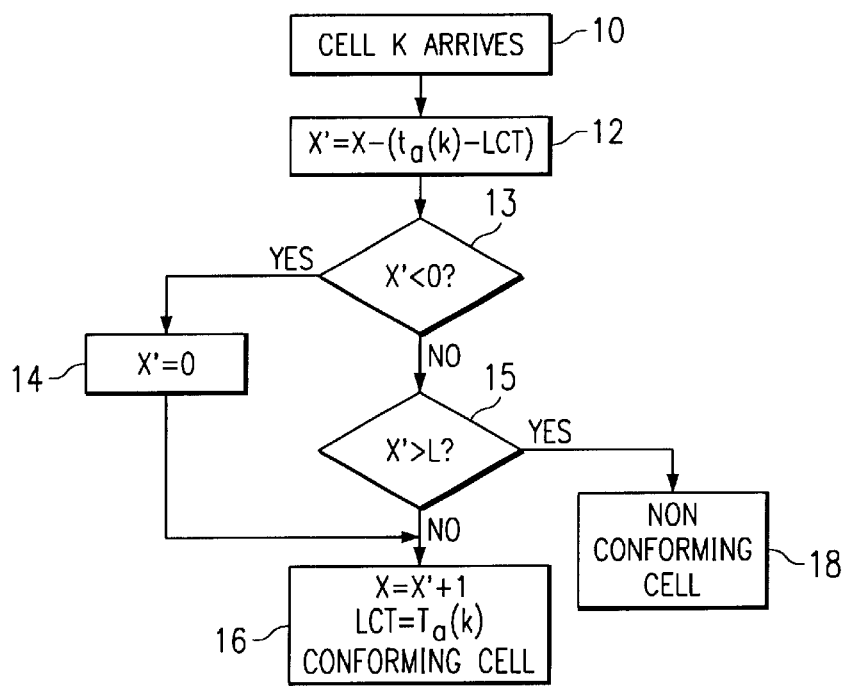
Figure 2:
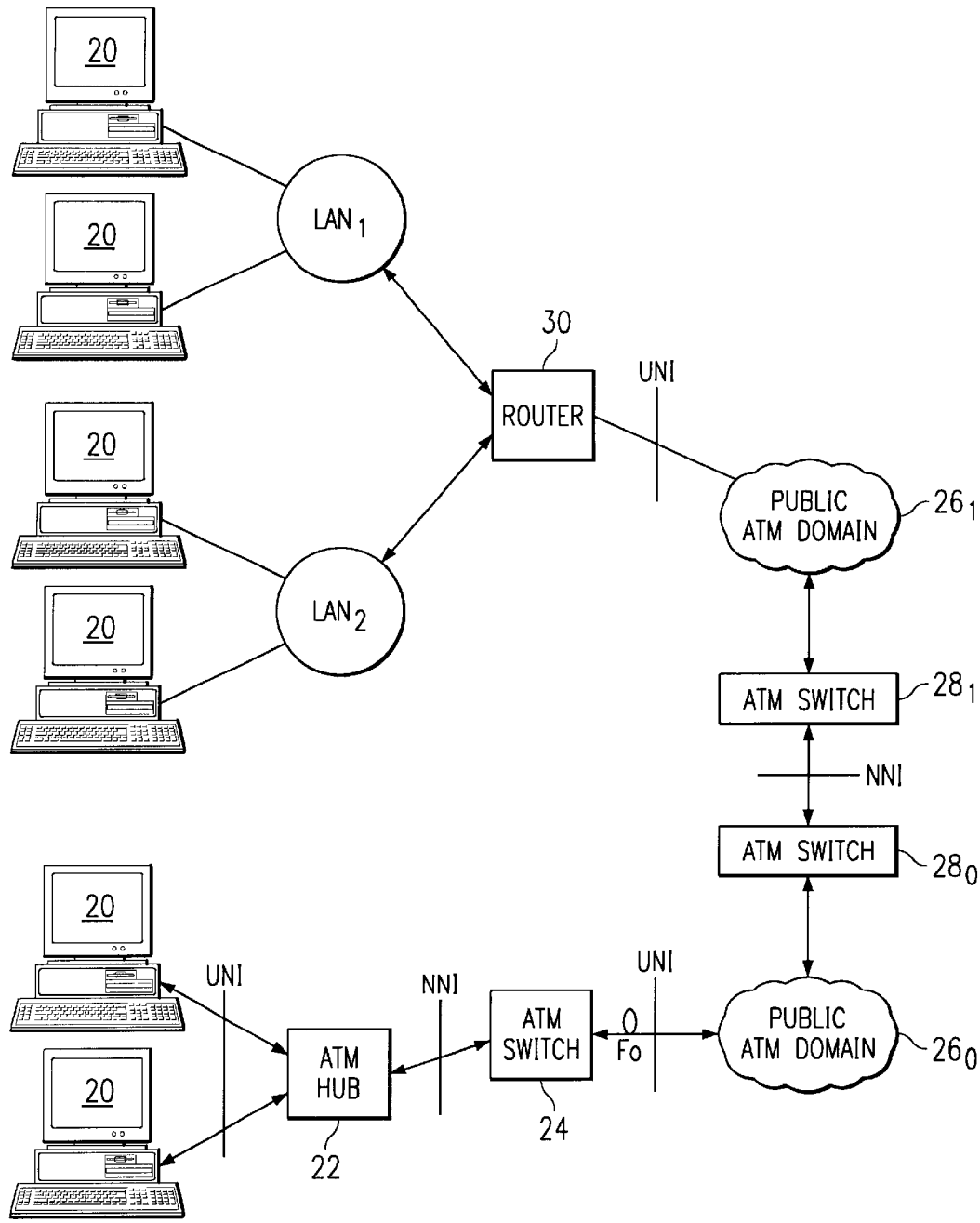
FIG. 2 is an electrical diagram, in block form, of a communications system incorporating the preferred embodiment of the present invention.

FIG. 2 illustrates an example of a large data communications network, to illustrate various locations therein at which traffic shaping and policing according to the preferred embodiment of the invention may be carried out. In this example, various user workstations 20 are deployed in the network, at locations that not only vary in a logical fashion (i.e., are deployed at various logical locations, or addresses, in the network) but which may also be deployed at widely varying, worldwide, physical locations. These exemplary workstations 20 illustrate that ATM communications ultimately occurs between individual human users, and may include computer readable data, video bitstreams, and data for audio playback.

ATM hub 22 is interfaced with two workstations 20 in the example of FIG. 2. Workstations 20 in this example are arranged in a "pure" ATM network (in which desktop workstations include ATM adapters), an emulated LAN (in which the ATM network supports an existing LAN), or a LAN of the Ethernet type, such that each workstation 20 is in communication with ATM hub 22; of course, workstations 20 may alternatively be arranged in a token-ring LAN or other LAN type. An example of a conventional pure ATM network is described in Introduction to SONET ATM (Texas Instruments Inc., 1996), and an example of an emulated LAN is described in *LAN Emulahon Over ATM Specification, Version* 1.0 (The ATM Forum, January 1995). ATM hub 22 includes the necessary functionality for recognizing those communications from one of workstations 20 that are intended to be communicated over the network of FIG. 2 to a remote destination, and for forwarding these commununications to ATM switch 24. In an ATM-to-desktop arrangement, the interface between workstations 20 and ATM hub 22 is of the User-to-Network Interface (UNI) type, and the interface between ATM hub 22 and ATM switch 24 is of the Network-to-Node Interface (NNI) type. In an Ethernet/ATM hub, the interface between workstation 20 and ATM hub 22 is Ethernet and the interface between ATM hub 22 and ATM switch 24 is of UNI type.

ATM switch 24 is a conventional switching device, for communicating ATM protocol communications between ATM hub 22 and the public ATM network, indicated by public ATM domain $26_0$. ATM switch 24 includes circuitry for performing those traffic management tasks required by the appropriate ATM specifications, such as *Traffic Management Specification, Version* 4.0 (The ATM Forum, April 1996). Additionally, ATM switch 24 includes such formatting circuitry as useful for applying signals to and receiving signals from the particular facility over which communications with public ATM domain $26_0$ is to take place; in this example, fiber optic facility FO connects ATM switch 24 to public ATM domain $26_0$. In this regard, operations such as policing and, if required by public ATM domain $26_0$, traffic shaping, may be performed by ATM switch 24.

As is known in the art, the public ATM communications network includes various "domains" 26, such as those that may be maintained by various Internet backbone providers and the like. For example, public ATM domains $26_0$, $26_1$ in the network of FIG. 2 may be maintained by different long distance providers, each of which may set requirements upon the traffic that is being transmitted to it not only from its own interfaces, but also from other domains 26. As such, in the example of FIG. 2, switches $28_0$, $28_1$ are provided between public ATM domains $26_0$, $26_1$, such that an NNI-type interface is present thereat. Traffic shaping and policing functions may be required, or desired, to be performed by ATM switches $28_0$, $28_1$, with traffic shaping requirements defined primarily by the receiving domain 26 for each channel.

In the example of FIG. 2, router 30 is illustrated as interfacing with public ATM domain 26, by way of a UNI-type interface. As is known in the art, routers such as router 30 interface multiple local-area networks (LANs). In this case, router 30 interfaces local-area networks $LAN_1$, $LAN_2$ with one another, each of which have multiple workstations 20 thereupon. In this example, local-area networks $LAN_1$, $LAN_2$ are of the token-ring type, but of course may alternatively be of an Ethernet type. Router 30 thus serves to effect communication among workstations 20 on local-area networks $LAN_1$, $LAN_2$ with one another, and to effect communication between workstations 20 on local-area networks $LAN_1$, $LAN_2$ and public ATM domain 26, (and beyond).

Of course, while FIG. 2 illustrates public ATM domain $26_0$ as coupled to ATM switch 24 and ATM hub 22, and public ATM domain 26, as coupled to local-area networks $LAN_1$, $LAN_2$ via router 30, each of public ATM domains $26_0$, $26_1$ will be in communication with many various facilities, including routers, ATM switches, ATM hubs, and the like. The arrangement of FIG. 2 is provided herein simply by way of example.

As noted above, at each of the interfaces of UNI type or NNI type, traffic shaping and policing functions may be involved. According to current ATM specifications set forth in *Traffic Management Specification, Version* 4.0 (The ATM Forum, April 1996), Usage Parameter Control (UPC) operations, including the Generic Cell Rate Algorithm (GCRA) are required at UNI interfaces, while Network Parameter Control (NPC) operations are optional at NNI interfaces. As noted above, NPC operations may be required by a downstream network domain so that adequate traffic shaping of incoming cells may be relied upon. As such, referring again to FIG. 2, each of ATM hub 22, ATM switches 24, $28_0$, $28_1$, and router 30 preferably are constructed to have the capability of performing leaky bucket policing, traffic shaping, or both, according to the preferred embodiment of the invention as will be described hereinbelow; in the event that certain ones of these functions need not perform such traffic shaping and policing (e.g., if the downstream network elements do not require such operations), these processes and functions may simply be disabled.

Figure 3A:
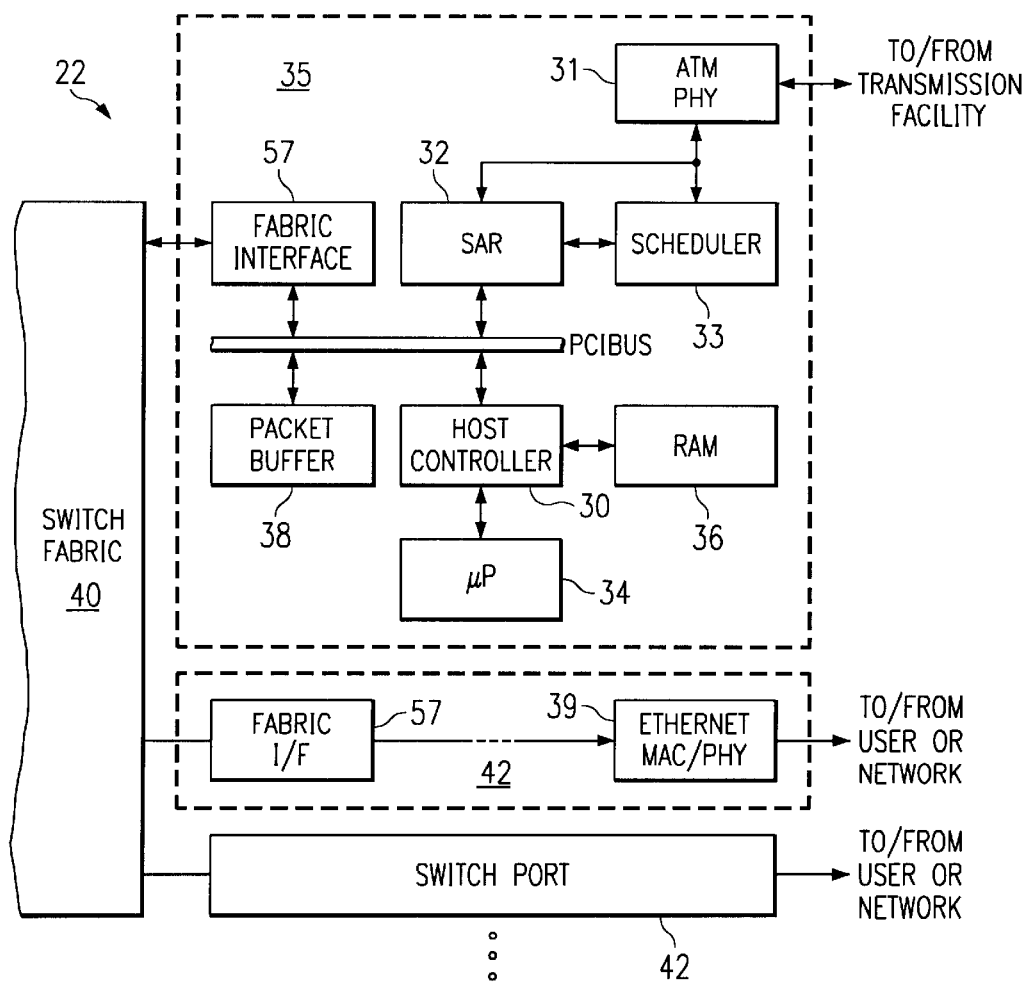
FIG. 3a is an electrical diagram, in block form, of an ATM network interface incorporating the preferred embodiment of the present invention.

Referring now to FIG. 3a, the architecture of ATM hub 22, particularly relative to the performing of the traffic shaping and policing operations according to the preferred embodiment of the invention, will now be described. As noted above, ATM hub 22 interfaces both to workstations 20, for example over an Ethernet LAN, and also to ATM switch 24 for ATM communications. In this example, therefore, ATM hub 22, in addition to its hub management functions, must also translate the Ethernet packets, which are about 1,500 bytes in length, into fixed-length ATM cells for communications from workstations 20 to ATM switch 24, and vice versa for received communications.

The construction of ATM hub 22 according to the preferred embodiment of the invention, as shown in FIG. 3a, will now be described. According to this embodiment of the invention, ATM hub 22 includes switch fabric 40 that routs received ATM packets and cells to the appropriate destination; in this regard, ATM hub 22 includes ATM uplink card 35 and Ethernet switch ports 42, among which the ATM communications are routed by switch fabric 40. ATM uplink card 35 connects ATM hub 22 to the ATM transmission facility over which ATM communications are carried out, while Ethernet switch ports 42 receive and transmit Ethernet communications from and to workstations 20, or to a network such as the Internet or an intranet LAN hub. In this example, switch fabric 40 includes the necessary functionality for recognizing those communications from workstations 20 (or from some other source coupled to one of Ethernet switch ports 42) that are intended for the ATM network, and for forwarding these communications to ATM uplink card 35.

ATM uplink card 35 includes ATM physical layer interface 31, which interfaces the processing circuitry of ATM uplink card 35 with the physical transmission facility over which ATM communications are carried out. ATM physical layer interface 31 is coupled to SAR device 32, which performs segmentation and reassembly functions for the translation handled by ATM uplink card 35. An example of a suitable SAR device 32 for use in connection with the preferred embodiment of the invention is the TNETA 1575 ATM Segmentation and Reassembly Device available from Texas Instruments Incorporated (the assignee of the present invention), programmed to effect the operations described hereinbelow. ATM uplink card 35 also includes scheduler 33, coupled to ATM physical layer interface 31 and also to SAR 32, and which performs the leaky bucket GCRA function described hereinbelow in effecting traffic shaping and traffic policing functions as appropriate. SAR device 32 is connected, via a PCI local bus PCIBUS, to PCI controller 30; PCI controller 30 is in turn connected to microprocessor central processing unit 34 and to memory 36, which control the overall operation of ATM uplink card 35. Packet buffer memory 38 is also connected to bus PCIBUS, and stores information about each of the ATM flows being communicated, as will be described hereinbelow. Fabric interface 57 provides an interface of bus PCIBUS, and its resident devices, to switch fabric 40.

As suggested by FIG. 3a, multiple Ethernet switch ports 42 are provided (only two are shown in FIG. 3a, for clarity). Each of Ethernet switch ports 42 include conventional functions for translating the communicated information between the ATM and Ethernet formats and protocols. In this regard, each Ethernet switch port 42 includes fabric interface 57 in communication with switch fabric 40, and Ethernet media access controller (MAC) or physical layer interface (PHY) 39 in communication with the associated device or network (e.g., Internet, intranet LAN hub, or workstation). The associated processors and other functional circuitry of Ethernet switch ports 42 are not shown, for clarity.

The construction of FIG. 3a may also be used to realize a router or a multi-layer switch. In these cases, either the processors in ATM uplink card 35 and Ethernet switch ports 42, or some other processor resident in a central module, processes the packet headers and transfers the packets to the appropriate ports based upon the contents of their header fields and routing tables. A central processor in this arrangement would also run the routing protocols and maintain routing tables as up-to-date.

Figure 3B:
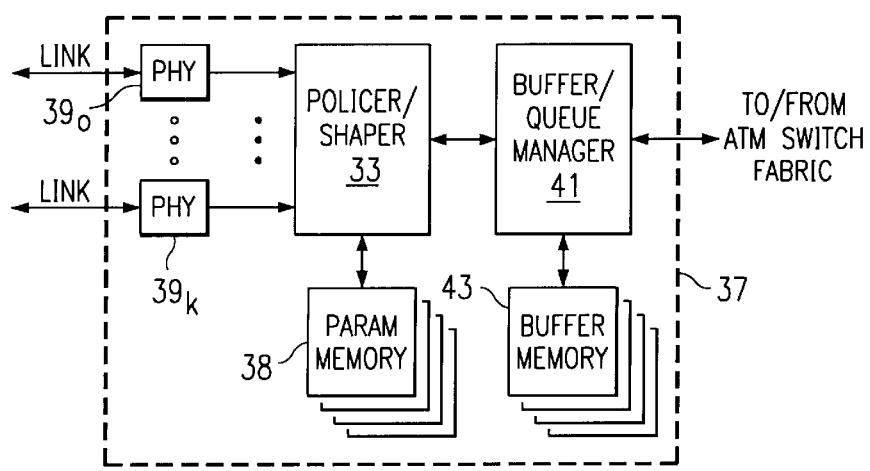
FIG. 3b is an electrical diagram, in block form, of an ATM switch incorporating the preferred embodiment of the present invention.

FIG. 3b illustrates another implementation of the preferred embodiment of the invention, in which the traffic policing and shaping functions are performed at the ingress and egress of each of ATM switches 24, 28. In this regard, FIG. 3b illustrates the construction of line card 37 suitable for implementation within ATM switches 24, 28. Line card 37 includes multiple physical layer interfaces $39_o$ through $39_k$, each of which interface the processing circuitry of line card 37 with the physical links over which ATM communications are carried out. These physical links may include metal conductors such as coaxial cable or twisted pair lines, fiber optic facilities, wireless links, and the like. Each of physical layer interfaces 39 is thus specifically realized to provide the interface functionality for its particular physical link.

As shown in FIG. 3b, policer/shaper function 33 is provided within line card 37, in communication with each physical layer interface 39. Policer/shaper function 33 performs the leaky bucket GCRA function according to the preferred embodiment of the invention, as will be described below, in cooperation with parameter memory 38. If the policing function of policer/shaper function 33 is enabled, the input cell stream arriving over the line will be checked for conformance against applicable traffic contracts. Similarly, the shaping function performed by policer/shaper function 33 will, if enabled, process the output cell stream prior to sending it out onto the line. Policer/shaper function 33 is in communication with buffer/queue manager 41 which, in conjunction with buffer memory 43, controls the communication of ATM cells to and from the ATM switch "fabric" (not shown). As is known in the art, the switch fabric includes the necessary and appropriate circuitry for routing individual ATM cells from source to destination; various types and implementations of switch fabric are well known in the art. As is evident from FIG. 3b, physical layer interfaces 39 thus operate to both receive and transmit ATM traffic from and to the ATM switch, with the routing of ATM cells accomplished via a realization of an ATM switch fabric.

In either the ATM network interface of FIG. 3a or the ATM switch of FIG. 3b, parameter memory 38 is a memory resource for storing information regarding each of the ATM channels handled by the particular system. This parameter memory 38 stores indicators, for each of the channels, regarding the various cell rates at which communications for that channel are to be carried out, as well as channel identifiers such as the Virtual Path Identifier (VPI) or Virtual Channel Identifier (VCI) for that channel. Specifically, according to the preferred embodiment of the present invention, parameter memory 38 stores, for each channel, values of Increment (I), Limit (L), and a field (TAT-L) corresponding to the difference between the current Theoretical Arrival Time for that channel and its Limit L. According to the preferred embodiment of the present invention, parameter memory 38 also stores, for some of the channels, timestamp offset and base values associated with each channel, with the value of the timestamp indicating the time at which the next cell for that channel is to be processed for communication. In this embodiment of the invention, parameter memory 38 may include on the order of 64 k thirty-two-bit words.

FIG. 4 illustrates the contents of a portion of parameter memory 38 according to the preferred embodiment of the invention. As illustrated in FIG. 4, parameter memory 38 includes multiple entries 44, each entry 44 associated with one of the virtual channels or VCs (also referred to as flows) that ATM hub 22 or ATM switch 24, 28 (as the case may be) is capable of processing at a given time. In the example of FIG. 4, where 2048 VCs can be simultaneously handled, 2048 (or 2 k) entries $44_0$ through $44_{2047}$ are stored in parameter memory 38.

Each of entries 44 may contain fields associated with a corresponding virtual channel, such as indicators of the cell rates at which communications for that channel are to be carried out, and channel identifiers (VPI or VCI), as noted above (such indicators not shown in FIG. 4, for clarity). According to the preferred embodiment of the present invention, each entry $44_j$ also includes increment field $I_j$, the value of which corresponds to the reciprocal of the Peak Cell Rate (PCR) of the associated channel; the PCR is the cell rate specified in the traffic contract established for the channel. Each entry $44_j$ also includes limit field $L^*_j$, which corresponds to the Cell Delay Variation Tolerance (CDVT), and as such is a measure of the maximum guaranteed delay between cell arrivals specified in the traffic contract for the channel. The * indicates that limit field $L^*_j$ is stored as the two's complement of its actual value, for efficiency of calculation as will be described hereinbelow.

According to the preferred embodiment of the present invention, each entry $44_j$ also includes theoretical arrival time field $(TAT-L)^*_j$, the value of which indicates a time (measured as a count value of a global timer, as will be described below) at which a cell may arrive and still be regarded by the policing or traffic shaping function as conforming to the traffic contract cell rate. According to this embodiment of the invention, field $(TAT-L)^*_j$ is stored as the two's complement of its actual value, and stores the difference of the Theoretical Arrival Time (TAT) and limit field L for the corresponding channel, rather than the actual Theoretical Arrival Time (TAT) itself. Furthermore, according to the preferred embodiment of the present invention, field $(TAT-L)^*_j$ for each entry $44_j$ is stored with fewer bits than the number of bits used to represent global time in ATM hub 22. In the exemplary embodiment of the present invention to be described hereinbelow, for example, field $(TAT-L)^*_j$ is stored as a twenty-two-bit field, rather than as a forty-bit field corresponding to the forty bits used to represent global time. In this way, the memory requirements of parameter memory 18 are greatly reduced, indeed by 36 kbits in this example (2 k entries 44 times eighteen bits).

Referring now to FIG. 5a, the theory of operation of the leaky bucket GCRA implemented according to the preferred embodiment of the present invention will now be described in general terms, relative to an exemplary sequence. FIG. 5a is a time line illustrating, relative to global time, the arrival of several cells for a specific virtual channel VC. In the example of FIG. 5a, each arrival time $t_a$ pertains to a cell of the same virtual channel VC, it being understood that cells from other channels will be arriving at various locations over this range in global time. At time $t_a(1)$, cell 1 arrives; prior to this time, based on previous cell arrivals, the Theoretical Arrival Time for cell 1 ($TAT_1$) has not yet passed, and as such the actual arrival time of cell 1 is early (e.g., $t_a(1)$ is less than $TAT_1$). However, actual arrival time $t_a(1)$ is within limit L of $TAT_1$ (i.e., $t_a(1)<TAT_1-L$). As such, the early arrival of cell 1 is within the Cell Delay Variation Tolerance (CDVT) of this virtual channel VC, and as such cell 1 is deemed to be conforming. According to the GCRA implementation according to the preferred embodiment of the invention, the Theoretical Arrival Time of the next cell, cell 2, is based upon the later of the actual arrival time of the current cell $t_a(1)$ and the current Theoretical Arrival Time $TAT_1$. Since, in this example, $TAT_1$ is later than (i.e., greater than) actual arrival time $t_a(1)$, $TAT_2$ is set to the sum of $TAT_1$ plus increment value I. As noted above, increment I is the period between cell arrivals of a channel at the Peak Cell Rate PCR.

In the example of FIG. 5a, cell 2 arrives at arrival time $t_a(2)$, which is after Theoretical Arrival Time $TAT_2$. Accordingly, cell 2 is conforming by definition, as it did not precede its Theoretical Arrival Time $TAT_2$. Since $t_a(2)$ is after $TAT_2$, the next Theoretical Arrival Time $TAT_3$ is stored as the sum of actual arrival time $t_a(2)$ and increment I.

The example of FIG. 5a illustrates non-conforming cell 3 arriving more than limit L prior to Theoretical Arrival Time $TAT_3$. In other words, cell 3 is outside of the Cell Delay Variation Tolerance (CDVT), for its channel, ahead of Theoretical Arrival Time $TAT_3$, and is therefore non-conforming with the GCRA. In this example, cell 3 could be simply discarded or, if the GCRA is operating according to CLP(0+1) priority, tagged for discard. Theoretical Arrival Time $TAT_3$ itself need not be updated, as its value may be used for comparison with the arrival time of a resend of cell 3, or of some other cell, for this channel.

The general operation of the GCRA according to the preferred embodiment of the present invention may thus be described relative to a flow diagram, as shown in FIG. 5b. Upon cell arrival, decision 45 is performed to compare the actual arrival time $t_a(k)$ against the time defined by the current Theoretical Arrival Time for the cell and virtual channel VC less the limit value L, in other words the difference TAT-L. If the arrival time is earlier than (less than) TAT-L (decision 45 is YES), the arriving cell is non-conforming, and is to be tagged or discarded. If the arrival time of the current cell is at least as late as TAT-L (decision 45 is NO), the cell is conforming, and the remaining operations are used to update the Theoretical Arrival Time value for the next cell for that channel. Decision 46 is performed, in this regard, to determine whether the current actual arrival time $t_a(k)$ is later than the current value of the Theoretical Arrival Time TAT. If so (decision 46 is YES), the current value of the Theoretical Arrival Time TAT is advanced to the current actual arrival time $t_a(k)$ in process 47. In either event (decision 46 is YES and process 47 is performed, or decision 46 is NO and process 47 is skipped), process 49 is performed to update the value of Theoretical Arrival Time TAT for the channel, by adding increment value I thereto. As such, the next Theoretical Arrival Time TAT for the channel is the later of the current arrival time $t_a(t)$ or the current Theoretical Arrival Time TAT, plus the increment value I. This operation of the flow of FIG. 5b corresponds to the examples presented in FIG. 5a, and discussed above.

According to the preferred embodiment of the invention, as noted above, a reduced bit-width field is provided in entries 44 of parameter memory 38 for storage of the Theoretical Arrival Time TAT for each corresponding virtual channel, with the reduction being relative to the bit-width of the global time value. In the preferred embodiment of the invention, twenty-two bits are used to store the Theoretical Arrival Time TAT (actually, as noted above, the difference value TAT-L is stored in each entry 44, rather than the Theoretical Arrival Time TAT of the channel), as opposed to the forty bits with which global time is represented. As such, according to the preferred embodiment of the present invention, the time range representable by reduced bit-width of the TAT-L representation is smaller than the time range representable by the larger bit-width of the global timer (22 bits versus 40 bits, in this example). As such, use of the smaller representation of TAT-L according to the present invention requires consideration of the wrapping-around of the reduced-bit width time representations in parameter memory 38, which of course occurs with greater frequency than wrap-around of the forty-bit global time base.

FIG. 5a illustrates a time range R that is represented by parameter memory 38 (specifically, by the TAT-L values of each entry therein). According to this preferred embodiment of the present invention, time range R is preferably larger than a selected multiple of increment value I; in the example described herein, time range R is greater than or equal to three times increment value I (i.e., $R \geq 3I$). In the example of FIG. 5a, time range R is approximately equal to three times increment value I. Of course, considering that the various virtual channels VCs under analysis will have varying increment values I, time range R is preferably at least as long as the desired multiple of the largest permissible value I. It is contemplated that the range of increment values I will be relatively well controlled, considering that increment value I for a channel corresponds to the reciprocal of the Peak Cell Rate (PCR) of the channel.

According to the preferred embodiment of the invention, the difference field (TAT-L) in each entry 44 of parameter memory 38 (i.e., for each virtual channel VC in operation) is compared against the current global time, such comparisons being carried out both sequentially ($VC_{i+1}$ is examined after $VC_i$) and repetitively (the next round of examinations begins as soon as the current round ends). In this example, where difference field (TAT-L) is twenty-two bits wide, the least significant bits (e.g., twenty LSBs with two leading zeroes appended) of the global time are periodically compared against the difference field (TAT-L). The periodicity with which such comparisons are performed is preferably the increment time I for the channel. These comparisons are carried out in the background, without requiring an arrival of a cell associated with the channel; indeed, upon arrival of a cell for the channel, the conformance testing will be carried out according to the general operation discussed above relative to FIG. 5b. The arrival time $t_a(k)$ of a cell will correspond to a time value t' within range R, where $t_a(k)= t'+nR$, n being a non-negative integer.

According to the preferred embodiment of the present invention, the periodic background comparison determines whether the value represented by the LSBs of the global time exceed that of the current value of the difference field (TAT-L) for a channel. If so, the difference field (TAT-L) is reset to zero, and if not, the difference field (TAT-L) is not updated. The resetting of the difference field (TAT-L) to zero when no cell has arrived by the time specified by difference field (TAT-L), simplifies the overall operation, as in this case the next difference field (TAT-L)$_{j+1}$ after cell arrival is necessarily set to the actual arrival time of the cell plus increment value I; furthermore, such a cell arrival is necessarily conforming, as the time corresponding to the difference field (TAT-L) has already passed. As a result, the longest time that a virtual channel can go without a cell arriving or its difference field (TAT-L) being updated in the background is 2I; this is because the background comparison may be performed instantaneously prior to the difference field (TAT-L) time (after having been performed one increment I time prior thereto), and then not performed for another increment I time thereafter. If, during this 2I period, the reduced width (22-bit) global time value wraps around, the previous cell arrival time and the new arrival time will necessarily be separated by at least the increment I time, since time range R is greater than or equal to 3I in this example. This relationship permits significant streamlining in the traffic shaping and policing function under the GCRA, according to the preferred embodiment of the invention, as will now be described in detail.

Referring now to FIG. 6, the construction of a portion of scheduler 33 for performing GCRA operations of the leaky bucket type will now be described in detail. As noted above, scheduler 33 refers to the implementation of FIG. 3a; alternatively, scheduler 33 of FIG. 6 may refer to the policer/shaper function 33 in the implementation of FIG. 3b. The circuitry illustrated as scheduler 33 in FIG. 6 is, of course, only part of the overall functionality of scheduler 33, considering the other operations required of this device in ATM hub 22 (and other applications, such as switches 24, 28, router 30, etc. in the system of FIG. 2). An example of the construction of some of such other functions in scheduler 33 is provided in copending application Ser. No. 08/993,801, filed Dec. 18, 1997, now U.S. Pat. No. 6,205,151, commonly assigned herewith and incorporated herein by this reference.

As shown in FIG. 6, scheduler 33 is coupled to parameter memory 38 which, in this preferred embodiment of the invention, includes entries 44 for each of the virtual channels VCs being handled by scheduler 33, such entries 44 arranged as described above relative to FIG. 4. This coupling may be made via bus PCIBUS, as illustrated in FIG. 3a, or directly as shown in FIG. 3b. Load/store unit 50 of scheduler 33 provides interface and control functions for the reading and writing of data from and to parameter memory 38; in this example, load/store unit 50 is operable to read the contents of a selected entry 44 in parameter memory 38, such selection being made by way of index circuit 58, for example, and for storing the read contents of the entry 44 in registers 52; conversely, load/store unit 50 is operable to write the contents of registers 52 into a selected entry 44 of parameter memory 38, as indicated by index circuit 58. Of course, the load and store functionality may be implemented in scheduler 33 in alternative realizations from load/store unit 50, according to techniques known in the art. Registers 52 are coupled to shaping circuitry 64 as will be described in detail hereinbelow.

Scheduler 33 includes global timer 54 which, in response to a clock signal received on line CLK, advances a forty-bit counter representative of a time value to be used within scheduler 33 (and elsewhere in ATM hub 22, as desired). This forty-bit value is presented within scheduler 33, for example to I timer 56 and to policing circuitry 64, on bus GT. According to the preferred embodiment of the invention, two leading zeroes are appended to the twenty LSBs of bus GT to form a twenty-two bit time representation on lines GT22; lines GT22 are applied to one input of adder 60, as shown in FIG. 6.

As described above relative to FIG. 4, each entry $44_j$ of parameter memory 38 includes difference field (TAT-L)*$_j$, which is the two's complement representation of the difference of the current value of the Theoretical Arrival Time (TAT$_j$) for channel j and its limit value L$_j$. In scheduler 33, as shown in FIG. 6, the value of difference field (TAT-L)*$_j$, is forwarded from registers 52 (after having been retrieved from parameter memory 38 by load/store unit 50) to a second input of adder 60. Adder 60 thus, in adding the two's complement of difference field (TAT-L)*$_j$ with the time value on lines GT22, effectively compares these values at its inputs and indicates, with the sign bit, which of the two inputs is of larger magnitude. The most significant bit of the result is forwarded by adder 60, on line SGN, to an input of AND function 62. AND function 62 receives the twenty-two-bit value of difference field (TAT-L)*$_j$ at another input, and performs a bit-by-bit logical AND operation of each bit of difference field (TAT-L)*$_j$ with the signal on line SGN from adder 60. The output of AND function 62 is presented back to registers 52.

In operation, adder 60, AND function 62, and the other circuitry of scheduler 33 illustrated in FIG. 6 execute background comparison of the current global time versus the value of difference field (TAT-L)*$_j$ for each virtual channel VC under analysis. Conversely, shaping circuitry 64 of scheduler 33 performs the traffic shaping function upon each arriving cells in controlling ATM transmissions. Circuitry 64 may alternatively effect traffic policing operations upon arriving ATM cells to ensure compliance with the traffic contract, depending upon the implementation; as will be evident from the following description, the operation of scheduler 33 in determining compliance is equivalent in both the traffic shaping and traffic policing functions. The operation of the background execution of scheduler 33 will now be described relative to FIG. 7, in combination with FIG. 6.

The bandwidth of accesses to and from parameter memory 38 is preferably high enough such that, even if the foreground policing process accesses parameter memory 38 for cells arriving continuously at line rate, sufficient bandwidth to and from parameter memory 38 would still remain to effect the background comparisons and updates. For example, if the foreground policing function is designed to carry out a read and a write access to parameter memory 38 within each cell time, parameter memory 38 should be designed to support two read and two write accesses per cell time, with the second read and write access available for the background process. In this way, time can be regarded as "slotted", such that during a given time slot either a red or a write can be performed by either of the foreground and background processes. In order to permit a read and a write by each of the foreground and background processes, each cell time would then include at least four parameter memory access time slots.

Figure 7:
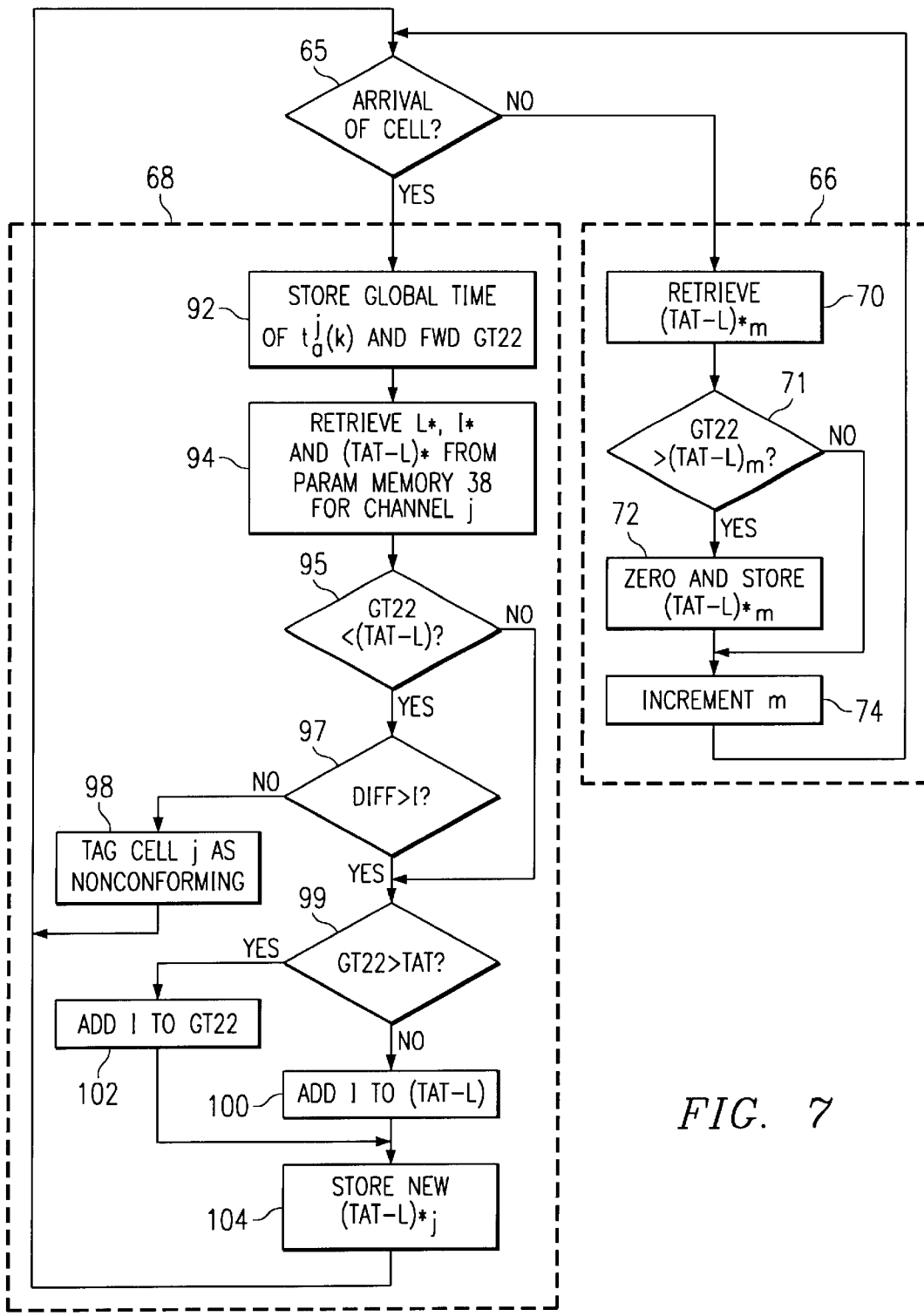
FIG. 7 is a flow diagram illustrating the operation of the circuitry of FIGS. 6 and 8 according to the preferred embodiment of the invention.

As illustrated in FIG. 7, scheduler 33 first determines, in decision 65, whether an ATM cell has arrived; in the slotted time example noted above, decision 65 would be performed once for every pair of parameter memory access time slots (or each half-cell-time, in this example). As illustrated in FIG. 6, shaping circuitry 64 and load/store unit 50 receives a signal on line ARR indicating the arrival of an ATM cell, and thus performs decision 65. If an ATM cell has arrived, a load is performed for channel $VC_j$ associated with the arrived cell, and control passes to policing process 68 described below. In the event that no ATM cell has arrived (decision 65 is NO), a load is performed for channel $VC_m$ using a channel-ID from index register 58. Index register 58 may be reset by a signal on line RSTRT, and is incremented by the inverted state of line ARR if no cell arrives. In this case, control passes to background process 66, the operation of which will now be described.

Upon determination that a background comparison is to be performed for a channel VC. (decision 69 is YES), process 70 is next performed by load/store unit 50 to retrieve the contents of difference field $(TAT-L)*_m$ from the corresponding entry $44_m$ of parameter memory 38 for the channel $VC_m$, and store these contents in one of registers 52. Decision 71 is then next performed by adder 60 of scheduler 33, by way of adding the two's complement representation of difference field $(TAT-L)*_m$ to the current global time value on lines GT22, and forwarding the sign bit on line SGN to AND function 62.

If the current global time on lines GT22 is greater in magnitude than the value of difference field $(TAT-L)*_m$, the sign bit of the addition performed by adder 60 will be zero (as the difference will be of positive magnitude). This situation corresponds to decision 71 returning a YES value. In this event, AND function 62 then initiates process 72, by zeroing each bit of the value of difference field $(TAT-L)*_m$ responsive to the sign bit on line SGN from the addition performed by adder 60 being zero; this zeroed value is forwarded to registers 52, for storage into difference field $(TAT-L)*_m$ of the corresponding entry $44_m$ of parameter memory 18. As noted above, the resetting of the difference field $(TAT-L)*_m$ is permissible considering that the next cell arrival for virtual channel $VC_m$ will be conforming (the Theoretical Arrival Time limit less its CDVT) having passed), and also considering that the next value of difference field $(TAT-L)*_m$ will be generated by adding increment value I to the actual arrival time of the cell. If, on the other hand, the global time on lines GT22 has not yet passed the time indicated by difference field $(TAT-L)*_m$ (decision 71 is NO), AND function 62 receives a one value on line SGN, which passes the current bit values of difference field $(TAT-L)*_m$ back to registers 52, for restoring (or simply not writing) into entry $44_m$ of parameter memory 38. In either case (decision 71 is YES or NO), the index m in index circuit 58 is advanced, in process 74, and control returns to process 65 from which background comparison process 66 can be repeated (in the absence of a cell arrival during the time slot for the policing process, or during any background process time slot) for the next virtual channel $VC_{m+1}$.

It is contemplated that the twenty-two-bit size for difference field (TAT-L)* is more than adequate, even for a large number of channels to be handled by scheduler 33. In one example of background comparison process 66, it has been observed that on the order of 9/2 clock cycles are required for execution. Even assuming a huge number of virtual channels, namely 64 k, less than $2^{20}$ clock cycles would be required to perform process 66 on all 64 k virtual channels. The twenty-two bits allowed for difference field (TAT-L)* thus provides at least four such passes of background comparison process 66 within one wrap-around of difference field (TAT-L)*.

Figure 8:
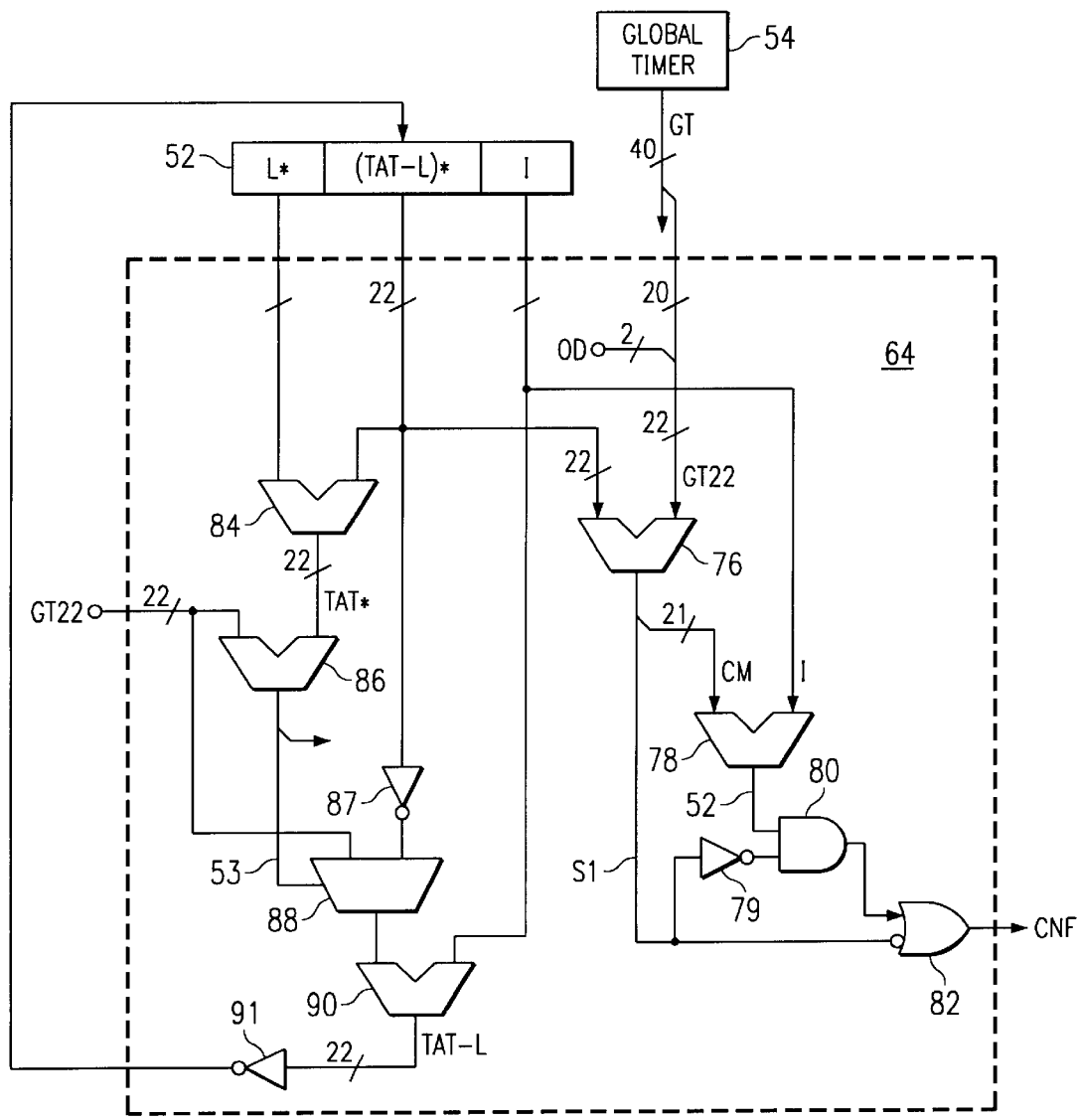
FIG. 8 is an electrical diagram, in block form, of shaping circuitry in the scheduler of FIG. 6, constructed according to the preferred embodiment of the invention.

Referring now to FIG. 8, the construction of shaping circuitry 64 according to the preferred embodiment of the invention will now be described in detail. According to this embodiment of the invention, shaping circuitry 64 includes both circuitry for determining whether an arrived cell is conforming, and also circuitry for updating the Theoretical Arrival Time value for the channel, by way of updating difference field (TAT-L)* for the channel. For use by both portions, the contents of one of registers 52 is illustrated in FIG. 6 for a virtual channel $VC_j$ for which a cell k has recently arrived, and contains limit field L* (as noted above, as a two's complement representation of the actual value), increment field I, and difference field (TAT-L)*.

The portion of shaping circuitry 64 for determining whether a cell is conforming includes adder 76 which receives, at one input, the portion of register 52 corresponding to difference field (TAT-L)*. The other input of adder 76 receives the LSB portion of the global time from global timer 54 on lines GT22 (upon which two leading zeroes are appended to the twenty LSBs of the global time from global timer 54, as described above). Adder 76 presents a twenty-two bit signed sum at its output. The sign bit is presented, on line S1, to an (inverting) input of OR gate 82, and also to one input of AND gate 80 (via inverter 79). The twenty-one magnitude bits from the output of adder 76 are presented, on lines CM, to one input of adder 78, which receives increment value I form registers 52 at its other input. Adder 78 also presents a signed output based upon the sum of the inputs, with sign bit (on line S2) presented to one input of AND gate 80. The output of AND gate 80 is presented to a second input of OR gate 82. OR gate 82 generates a signal at its output, on line CNF, which indicates with an active state that the received cell is conforming, as will be described below.

As noted above, another portion of shaping circuitry 64 is provided to update difference field (TAT-L)* for the channel VC that received the ATM cell. In this regard, adder 84 receives difference field (TAT-L)* from register 52 at one input, and limit field L* at a second input As both of these inputs are negatively signed two's complement representations, the output of adder 84 corresponds to the two's complement representation of the actual Theoretical Arrival Time, TAT*, for the current virtual channel VC. This twenty-two-bit value is applied to one input of adder 86, which receives the global time on lines GT22 at a second input. The output of adder 86 is a signed value, with the sign bit forwarded on line S3 to a control input of multiplexer 88. Multiplexer 88 receives the twenty-two bit global time from lines GT22 at one input, and the present value of difference field (TAT-L) at another input, via inverter 87 from register 52. The output of multiplexer 88, corresponding to the selected one of its inputs, is applied to one input of adder 90; adder 90 receives increment field I from register 52 at another input The output of adder 90 is a non-negative value, presented on lines TAT-L to inverter circuit 91, which generates a two's complement representation of the value on lines TAT-L that is coupled back into difference field (TAT-L)* of register 52.

The operation of shaping circuitry 64 of FIG. 8 in determining whether an arrived ATM cell is conforming, and the updating of the Theoretical Arrival Time value in such a case, will now be described relative to the flow chart of FIG. 7. The operation of shaping circuitry 64 begins with the arrival of an ATM cell, as determined by decision 65. This arrival may be indicated by activation of a signal on line ARR from elsewhere in scheduler 33, as illustrated in FIG. 6, or by way of another conventional approach. Upon receipt of a cell, scheduler 33 notes the arrival time (represented as arrival time $t_a^j(k)$, for cell k of virtual channel $VC_j$) of the cell, as the then-current value of the global time at global timer 54; as this arrival time is used for several processes, it is preferred to latch or otherwise store this arrival time, for example within global timer 54. In addition to this storing operation, process 92 of FIG. 7 forwards the LSBs of arrival time $t_a^j(k)$, with two appended leading zeroes as described above, on lines GT22 to adders 76, 86, and multiplexer 88, of policing circuitry 64.

In process 94, scheduler 33 next retrieves, from entry $44_j$ of parameter memory 38, entry $44_j$ corresponding to the virtual channel $VC_j$ associated with the recently-arrived cell k, limit field $L^*_j$, increment field $I_j$, and difference field $(TAT-L)^*_j$, and stores these field values in register 52. As noted above, difference field $(TAT-L)^*_j$ is then forwarded to one input of adder 76, along with the arrival time on lines GT22. Adder 76 then effects decision 95 by determining whether the cell arrival time portion on lines GT22 is less than (i.e., earlier than) the Theoretical Arrival Time less the CDVT. Adder 76 performs this comparison by adding the two's complement difference field $(TAT-L)^*_j$ to the time value on lines GT22. If the arrival time is at or later than (greater than or equal to) difference field $(TAT-L)^*_j$, (decision 95 is NO), the arrived cell k is necessarily conforming. This conforming condition is indicated by sign bit of line S1 being low, due to the negative value of difference field $(TAT-L)^*_j$, being less in magnitude than the positive value on lines GT22. Line S1 at a low level forces line CNF at the output of OR gate 82 to a high, active, state, indicating the conforming condition to other circuitry in scheduler 33. Control then passes to decision 99 for determination of the update to difference field $(TAT-L)^*_j$, as will be described below.

On the other hand, if the arrival time is earlier than difference field $(TAT-L)^*_j$ (decision 95 is YES), the arrived cell k may or may not be conforming; this condition is indicated by sign bit Si from adder 76 being high The driving of sign bit S1 high by adder 76 permits the output of AND gate 80 (which is then controlled solely by adder 78 considering the operation of inverter 79) to control the conforming decision; control then passes to decision 97, which is performed by adder 78 comparing the difference magnitude (i.e., all bits other than sign bit S1) communicated from adder 76 on lines CM, to increment field I from register 52 for the current channel $VC_j$. As noted above, because of the wrapping around of the reduced bit-width time base used to store difference field $(TAT-L)^*_j$, and because of the continued resetting of difference field $(TAT-L)^*_j$ to zero when appropriate as described above, a conforming cell may be detected either when the arrival time is less than the difference field $(TAT-L)^*_j$ for the channel, or at least differs from difference field $(TAT-L)^*_j$ by more than the increment value $I_j$ for the channel $VC_j$. As such, adder 78 generates a difference, considering that the value on lines CM from adder 76 are of opposite sign relative to increment value $I_j$, in those cases where line S1 is high; as noted above, if line S1 is low, the cell is necessarily conforming anyway and the output of adder 78 will note be used. In the event that the difference from adder 76 is less than increment field I (decision 97 is NO), sign bit S2 is low. This low level, applied to AND gate 80, results in OR gate 82 driving line CNF low, considering that the high level signal on line S1 is inverted at its corresponding input to OR gate 82. Control then passes to process 98, in which other circuitry (not shown) in scheduler 33 tags the arrived cell k as non-conforming, discarding it as appropriate for the particular traffic control that has been undertaken.

If the difference from adder 76 on lines CM is greater than increment field $I_j$, line S2 corresponding to the sign bit of the output of adder 78 is driven high, indicating that the arrived cell k is conforming. In this case (decision 97 is YES), control passes to decision 99 for updating difference field $(TAT-L)^*_j$ with the appropriate value, depending upon the time at which cell k arrived.

In decision 991 the cell arrival time on lines GT22 is compared against the Theoretical Arrival Time value for the current channel $VC_j$. Because, instead of the Theoretical Arrival Time itself, difference field $(TAT-L)^*_j$ is stored for each virtual channel VC, decision 99 is performed by the combination of adders 84, 86 in shaping circuitry 64 of FIG. 8. Specifically, adder 84 receives and adds the two's complement representations of difference field $(TAT-L)^*_j$ and limit field $L^*_j$ for channel $VC_j$, to generate a two's complement value on lines $TAT^*_j$, which is of course the two's complement of the actual Theoretical Arrival Time, expressed as a twenty-two bit value. The value on lines TAT* from adder 84 is then added to the arrival time value on lines GT22, with the sign bit on line S3 from the output of adder 78 indicating the result of the comparison.

Line S3 indicates, with an active high level, that the arrival time on lines GT22 is less than (earlier than) the actual Theoretical Arrival Time. As discussed above in the general operation described relative to FIG. 5b, the next instance of Theoretical Arrival Time is then to correspond to the current TAT plus the increment value I. Accordingly, in this event (decision 99 is NO), control passes to process 100, in which increment field $I_j$ is added to the (non-inverted) difference field $(TAT-L)_j$ to generate the next difference field $(TAT-L)^*_j$ for virtual channel $VC_j$. Shaping circuitry 64 performs process 100 by the active high state of line S3 controlling multiplexer 88 to select difference field (TAT-L) $*_j$ (after inversion by inverter 87) for application to adder 90; adder 90 then completes the addition of difference field $(TAT-L)_j$ with increment field $I_j$ from register 52, presenting the results on lines TAT-L to inverter 91 and then back to register 52.

In the event that the cell arrival time on lines GT22 is greater than (later than) the actual Theoretical Arrival Time, line S3 is at a low level; this corresponds to decision 99 being YES, with control then passing to process 102. As is also discussed above, the next instance of Theoretical Arrival Time for the channel $VC_j$ is to correspond to the actual arrival time $t_a^j(k)$ plus the increment value $I_j$. In shaping circuitry 64 of FIG. 8, process 102 is effected by multiplexer 88, under control of the low level on line S3, selecting lines GT22 to be added to increment value $I_j$ by adder 90. The result of adder 90, on lines TAT-L, is forwarded via inverter 91 to register 52, for eventual storage in parameter memory 38 via load/store unit 50.

In either case (decision 99 either YES or NO), process 104 is then performed by shaping circuitry 64 storing the new value of difference field $(TAT-L)^*_j$ into registers 52 and, eventually through the operation of load/store unit 50 of scheduler 33, into entry $44_j$ of parameter memory 38. Control then passes back to decision 65 to either await arrival of the next ATM cell, or to execute background comparison process 66, as described above, as the case may be.

According to the preferred embodiment of the invention, therefore, the memory resources required for parameter memory 38 are much reduced than in the case where the actual Theoretical Arrival Time is stored for each of the virtual ATM channels that can be handled by the ATM hub, switch, router, or other interface device that is to effect policing or traffic shaping in data communications. This reduced memory requirement is significant, considering the large number of channels (2k and up) that may be handled. Furthermore, it is contemplated that the policing and traffic shaping function according to the present invention will be efficiently implemented according to conventional integrated circuit technology, an example of which is described hereinabove. As a result, the present invention provides the important benefits of not only a memory efficient approach, but also enables low cost realization of these functions, further improving the cost-effectiveness of ATM and similar data communications networks and devices.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of monitoring information communicated over a network to determine conformance of the communicated information with a traffic contract, the information arranged as cells from a plurality of virtual channels, comprising the steps of:

storing, in a memory, and for each of the plurality of channels, a difference field value corresponding to a time after which a next arriving cell of the channel is conforming, and an increment value corresponding to a cell rate for the channel;

digitally monitoring a global time using a number of bits larger than a number of bits with which the difference field value is stored in the memory for each of the plurality of channels;

for each of the plurality of channels, periodically comparing a least significant portion of the global time to the difference field value and, responsive to the least significant portion of the global time exceeding the difference field value, resetting the difference field value for the channel; and responsive to receiving a cell for a channel at an arrival time, performing the steps of:

first comparing a least significant portion of the arrival time of the received cell to the difference field value for the channel;

responsive to the comparing step determining that the least significant portion of the arrival time is earlier than the difference field value, comparing a difference between the least significant portion of the arrival time and the difference field value to the increment value for the channel;

responsive to the difference comparing step determining that the difference does not exceed the increment value, issuing a signal indicating that the cell is nonconforming; and responsive to either the comparing step determining that the least significant portion of the arrival time is not earlier than the difference field value or to the difference comparing step determining that the difference exceeds the increment value, updating the difference field value for the channel.

2. The method of claim 1, wherein the updating step comprises:

determining, from the parameter memory, a theoretical arrival time for the channel, the theoretical arrival time represented by a fewer number of bits than the number of bits used in the digitally monitoring step;

comparing the least significant portion of the arrival time to the theoretical arrival time for the channel;

responsive to the arrival time comparing step determining that the least significant portion of the arrival time is later than the theoretical arrival time, adding the increment value for the channel to the least significant portion of the arrival time to form a new difference field value;

responsive to the arrival time comparing step determining that the least significant portion of the arrival time is earlier than the theoretical arrival time, adding the increment value for the channel to the difference field value to form the new difference field value; and then storing the new difference field value in the memory.

3. The method of claim 2, wherein the storing step also stores, for each of the plurality of channels, a limit value corresponding to a time variation value of the channel;

and wherein the step of determining a theoretical arrival time comprises:

adding the difference field value for the channel to the limit field value or the channel.

4. The method of claim 1, wherein the difference field value corresponds to a difference between the theoretical arrival time of the next cell for the channel and the limit value for the channel.

5. The method of claim 4, wherein the storing step stores, for each channel, the difference field value in memory as a negative of the theoretical arrival time of the next cell for the channel and the limit value for the channel.

6. The method of claim 1, wherein the resetting step comprises setting the difference field value for the channel to zero.

7. The method of claim 1, wherein the cells are of fixed length.

8. The method of claim 7, wherein the communications are carried out using Asynchronous Transfer Mode protocol.

9. A system for monitoring information communicated over a network to determine conformance of communicated data cells with a traffic contract, comprising:

parameter memory for storing, in association with each of a plurality of virtual channels, a difference field value corresponding to a time after which a next arriving cell of the channel is conforming, and an increment value corresponding to a cell rate for the channel, wherein the difference field value for each channel is stored using a first number of bits;

a timer, for maintaining a global time using a second number of bits, the second number of bits being larger than the first number of bits;

a first compare circuit, for periodically comparing, for each of the plurality of channels, a least significant portion of the global time to the difference field value for the channel;

a reset circuit, having an input coupled to receive a signal from the first compare circuit, and having an output coupled to the parameter memory, for resetting the difference field value for the channel responsive to the first compare circuit determining that the least significant portion of the global time is greater than the difference field value;

monitoring circuitry, coupled to the parameter memory, for determining whether a cell received at an arrival time conforms to the traffic contract, comprising:

a difference circuit, for determining a signed difference between a least significant portion of the arrival time and the difference field value for the channel associated with the received cell;

a second compare circuit, for comparing the signed difference to the increment value for the channel;

conformance logic, coupled to the difference circuit and the second compare circuit, for generating a signal indicating that the received cell is conforming responsive either to the difference circuit determining that the least significant portion of the arrival time is not less than the difference field value, or to the second compare circuit determining that the signed difference is greater than the increment value for the channel; and circuitry, coupled to the parameter memory, for updating the difference field value for the channel to a sum of the increment value for the channel with the greater of the difference field value and the least significant portion of the arrival time.

10. The system of claim 9, wherein the parameter memory is also for storing, for each of the plurality of channels, a limit value corresponding to a time variation value of the channel;

and wherein the difference field value for each channel corresponds to the difference between a theoretical arrival time of the next cell for the channel and the limit value.

11. The system of claim 10, wherein the parameter memory stores the difference field value and the limit field value for each channel in two's complement form.

12. The system of claim 11, wherein the first compare circuit comprises a first adder, for generating a signed sum of the two's complement difference field value and the least significant portion of the global time;

and wherein the reset circuitry comprises conjunctive logic, for performing an AND function of each of the bits of the difference field value with a sign bit from the output of the first compare circuit.

13. The system of claim 11, wherein the second compare circuit comprises a second adder, for generating a signed sum of the two's complement difference field value and the least significant portion of the arrival time.

14. The system of claim 9, wherein the cells are of fixed length.

15. The system of claim 14, wherein the communications are carried out using Asynchronous Transfer Mode protocol.

* * * * *